Figure 1:
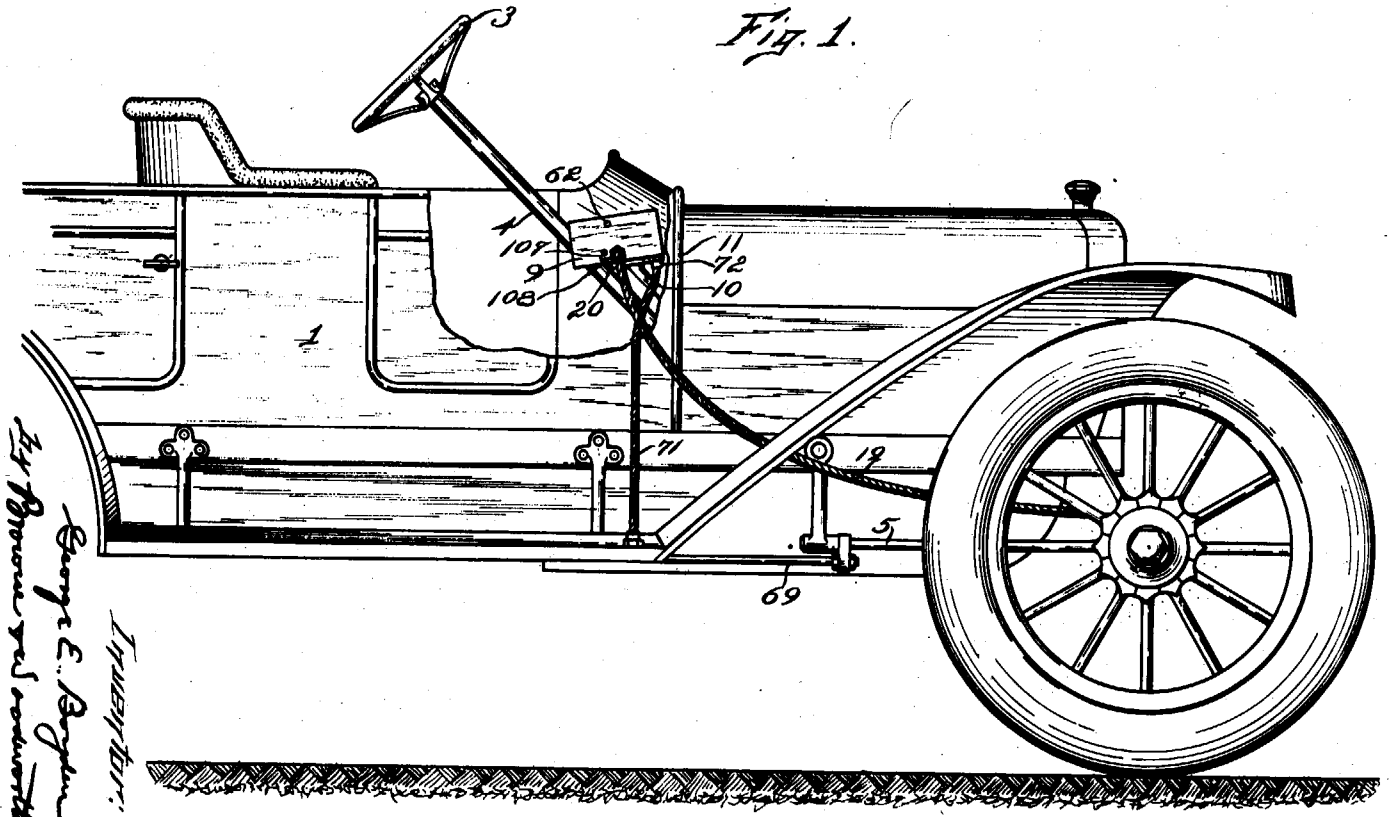

G. E. BOYDEN.

CHART FOR VEHICLES.

APPLICATION FILED OCT. 6, 1916.

Reissued Mar. 5, 1918.

14,438

8 SHEETS—SHEET 1.

Inventor:
George E. Boyden
By Browne & Woodworth
Att'ys.

G. E. BOYDEN.

CHART FOR VEHICLES.

APPLICATION FILED OCT. 6, 1916.

Reissued Mar. 5, 1918.

14,438.

8 SHEETS—SHEET 2.

Inventor:
George E. Boyden
by Browne & Woodworth
Attys.

G. E. BOYDEN.

CHART FOR VEHICLES.

APPLICATION FILED OCT. 6, 1916.

Reissued Mar. 5, 1918.

14,438.

8 SHEETS—SHEET 3.

Inventor:
George E. Boyden
by Brown & Woodworth
Attys

G. E. BOYDEN.

CHART FOR VEHICLES.

APPLICATION FILED OCT. 6, 1916.

Reissued Mar. 5, 1918.

14,438.

3 SHEETS—SHEET 4.

Inventor:
George E. Boyden
by Browne & Woodworth
Attys.

G. E. BOYDEN.

CHART FOR VEHICLES.

APPLICATION FILED OCT. 6, 1916.

Reissued Mar. 5, 1918.

14,438.

8 SHEETS—SHEET 5.

Inventor:
George E. Boyden
By Browne & Woodworth
Attys.

G. E. BOYDEN.
CHART FOR VEHICLES.
APPLICATION FILED OCT. 6, 1916.
Reissued Mar. 5, 1918.
14,438.
8 SHEETS—SHEET 6.
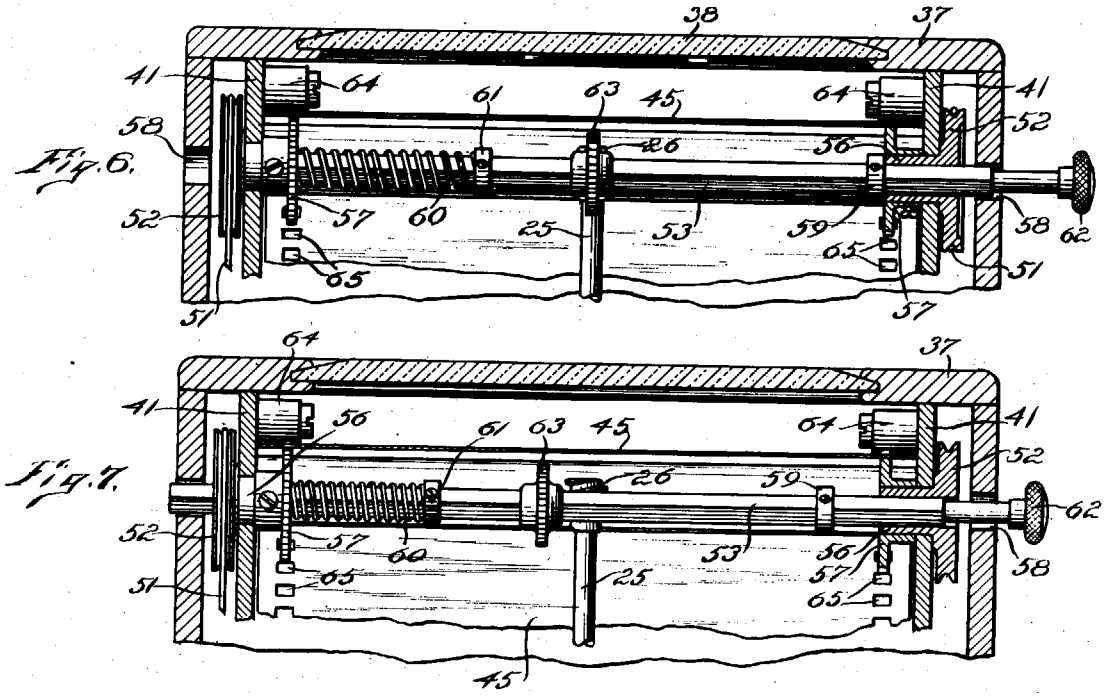
Inventor:
George E. Boyden
by Browne & Woodworth
Attys.

G. E. BOYDEN.

CHART FOR VEHICLES.

APPLICATION FILED OCT. 6, 1916.

Reissued Mar. 5, 1918.

14,438.

8 SHEETS—SHEET 7.

Witnesses:

George E. Boyden

Hill Browne & Woodworth

Attys.

G. E. BOYDEN.

CHART FOR VEHICLES.

APPLICATION FILED OCT. 6, 1916.

Reissued Mar. 5, 1918.

14,438.

8 SHEETS—SHEET 8.

Inventor:
George E. Boyden
By Browne & Woodworth
Attys.

UNITED STATES PATENT OFFICE.

GEORGE E. BOYDEN, OF NEW YORK, N. Y., ASSIGNOR, BY MESNE ASSIGNMENTS, TO OLIVER M. FARRAND AND GEORGE E. BOYDEN, BOTH OF NEW YORK, N. Y.

CHART FOR VEHICLES.

14,438. Specification of Reissued Letters Patent. Reissued Mar. 5, 1918.

Original No. 1,113,747, dated October 13, 1914, Serial No. 661,765, filed November 22, 1911. Application for reissue filed October 6, 1916. Serial No. 124,194.

*To all whom it may concern:*

Be it known that I, GEORGE E. BOYDEN, a citizen of the United States, residing in the borough of Manhattan, city, county, and State of New York, have invented a new and useful Improvement in Charts for Vehicles, of which the following is a specification.

This invention relates to apparatus for producing and tracing road-charts, and has particular reference to means to be applied to moving vehicles, such, for example, as motor-cars, for the purpose of producing charts of roads over which the car is traveling, and for enabling the driver of the car to follow accurately any road delineated on a given chart.

Among the objects of my invention may be noted the following: to provide a device, applicable to road vehicles, by which the driver of the vehicle may readily follow the roads charted upon a web or map; to provide an apparatus, applicable to road vehicles, by which a road over which the vehicle is traveling may be charted or produced upon the web in all its details of windings, curves and turns; to provide means, in combination with the steering-gear of a road vehicle, by which the driver of the vehicle may readily find his way, or by which the way or road followed by him may be accurately charted for subsequent use; to provide a compact and simple means by which a road-chart may be caused to travel under the eyes of the driver of a vehicle to which latter the chart may be operatively attached; and to provide certain details of construction by means of which the foregoing objects are attained simply, cheaply and accurately.

With the above objects in view, and others which will be detailed during the course of this description, my invention consists in the parts, features, elements and combinations of elements, all as hereinafter described and claimed.

Figure 2:
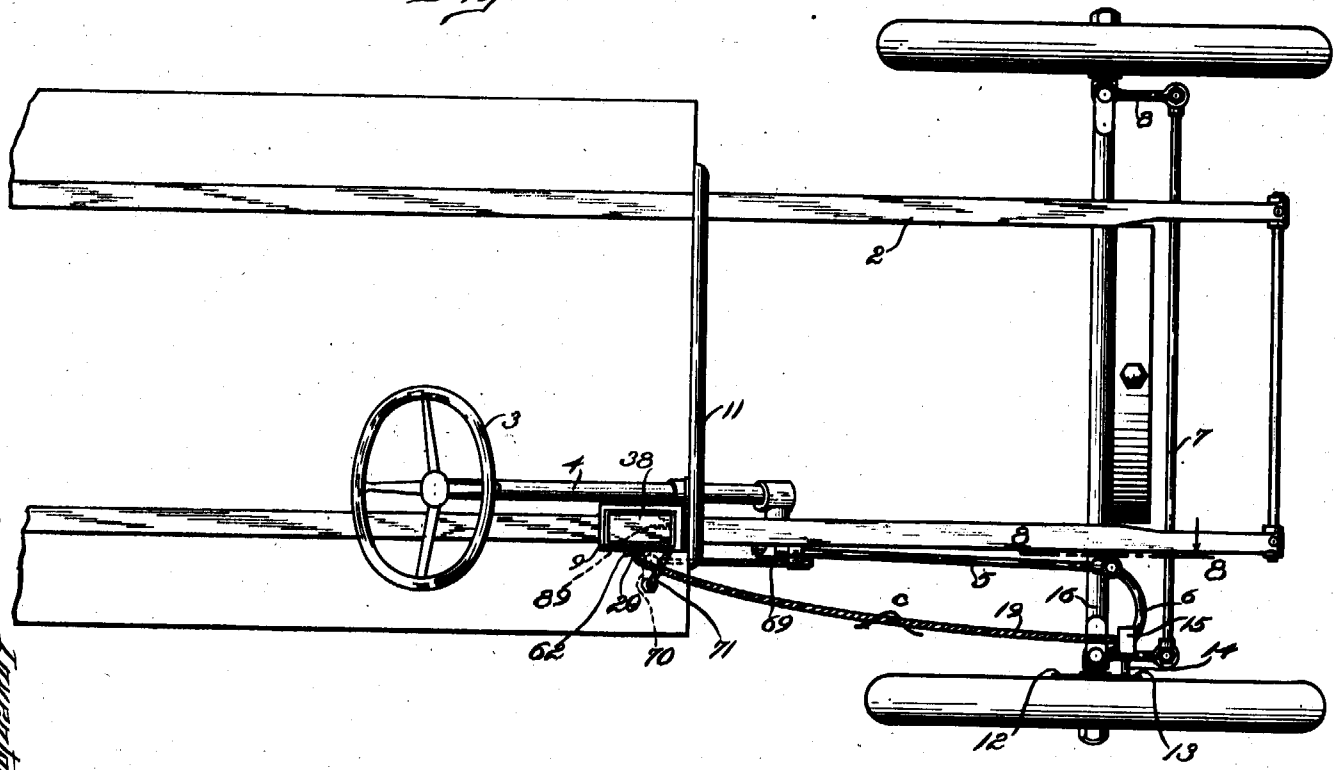
Figure 3:
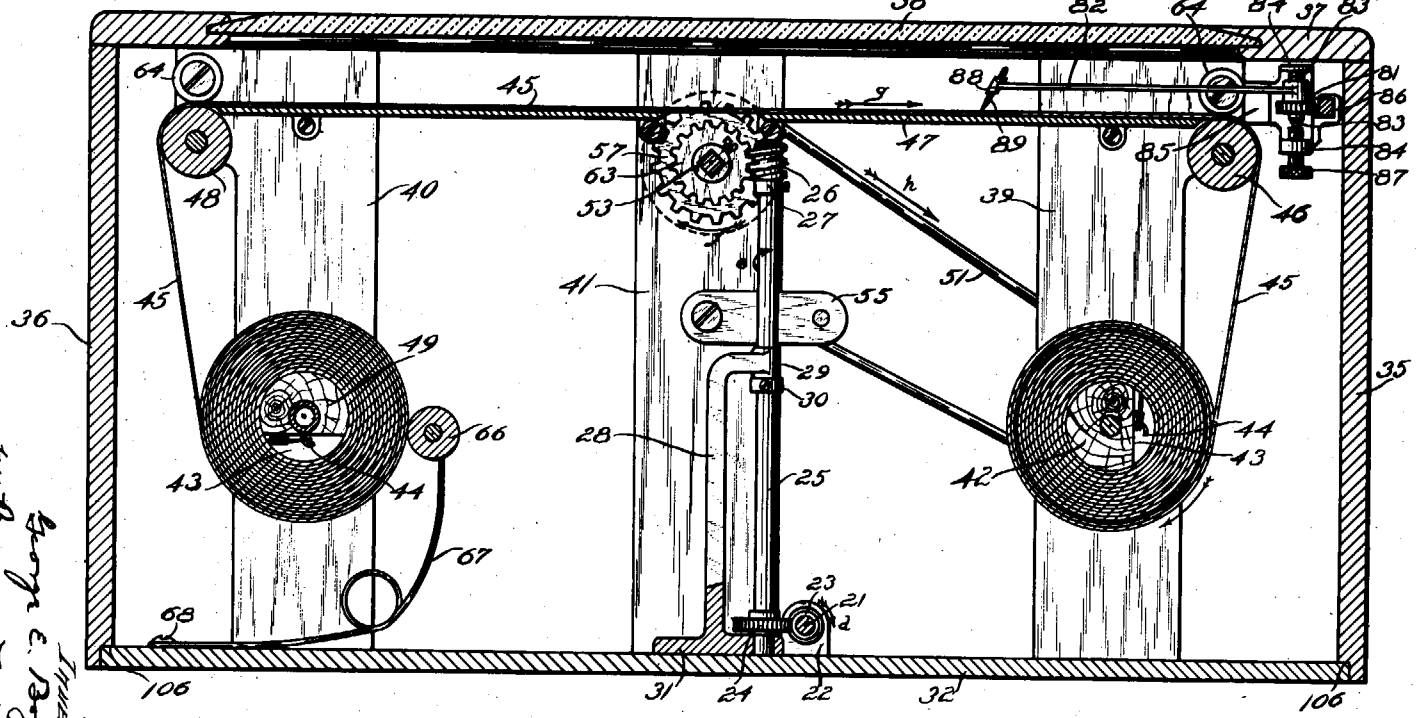
Figure 4:
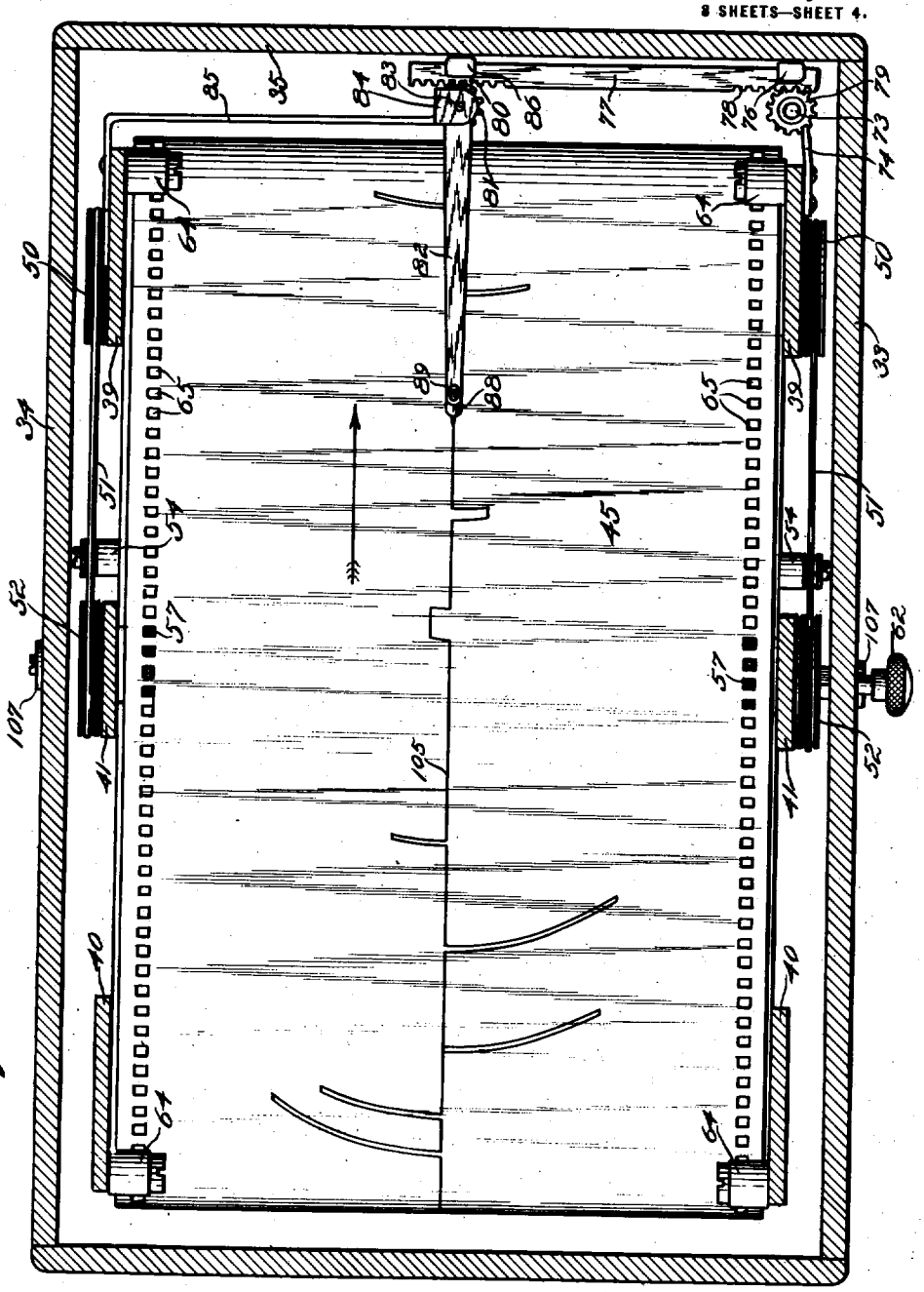
Figure 5:
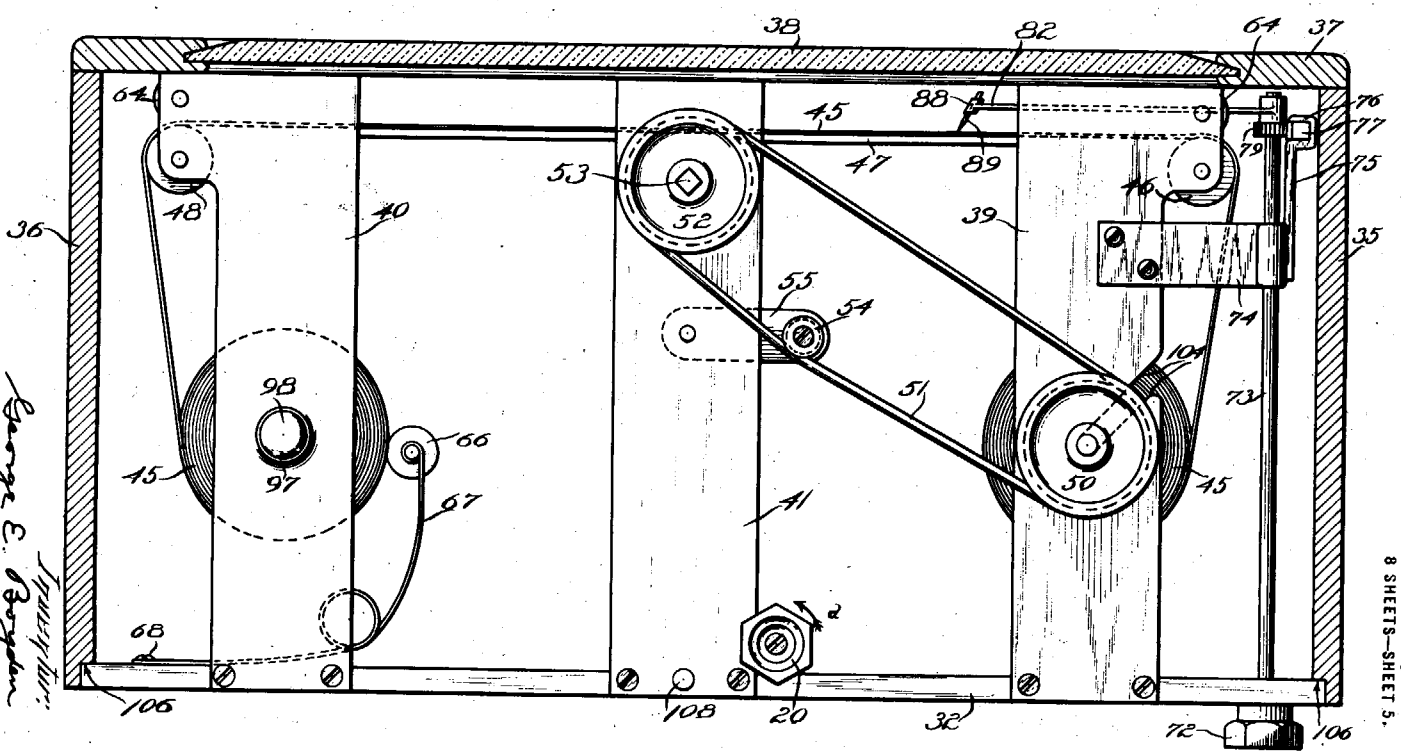
Figure 11:
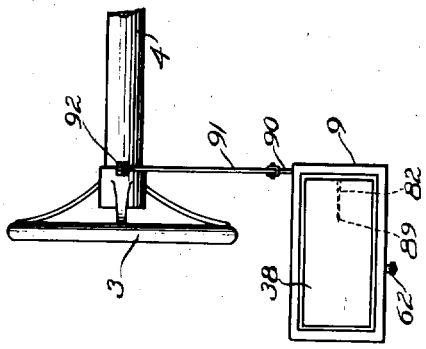
Figure 10:
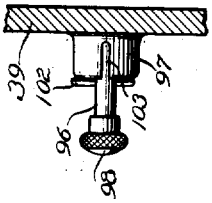
Figure 9:
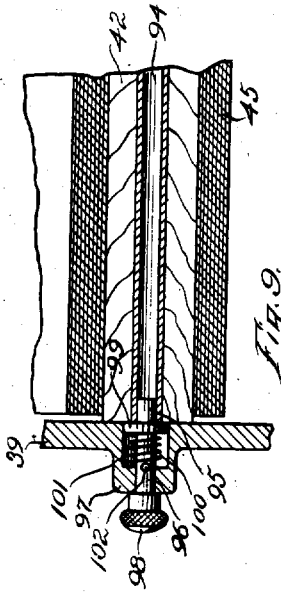
Figure 8:
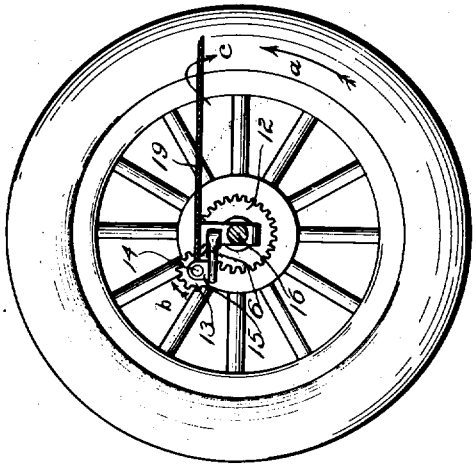
Figure 12:
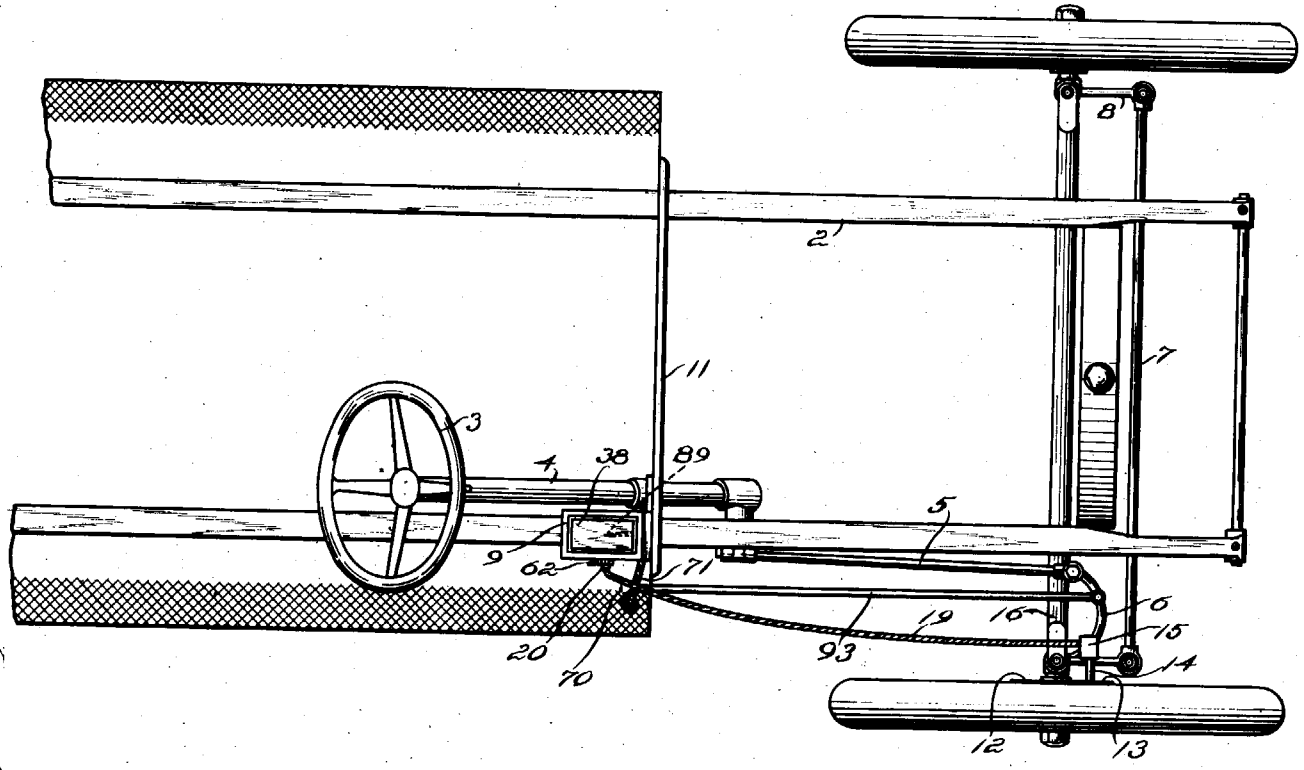

In order that my invention may be clearly understood, I have provided drawings, wherein:

Figure 1 is a side elevation of a conventionally represented motor-vehicle with my road-chart attachment applied thereto; Fig. 2 is a top-plan view of a portion of the chassis of the motor-vehicle and the front truck thereof showing the application of my invention thereto; Fig. 3 is a longitudinal, central section of the chart-box or frame in which the charting mechanism is contained; Fig. 4 is a horizontal section of the chart-box taken just below the top thereof; Fig. 5 is a vertical, longitudinal section of the chart-box taken just outside the supports at one side of the box; Fig. 6 is a sectional elevation showing a detail illustrating the means by which the charting or tracing mechanism may be thrown into and out of operation, the parts being shown in operative position; Fig. 7 is a view similar to Fig. 6 showing the parts in an inoperative position; Fig. 8 is a detail showing in sectional elevation one of the steering-wheels with the gearing connected thereto by which the flexible shaft, connecting with the web-feeding mechanism, is operated, the section being on the line 8—8 of Fig. 2; Fig. 9 is a sectional view showing a detail of the means by which the web-cylinders are supported; Fig. 10 is a sectional view showing the said cylinder-supporting means in another position; Fig. 11 is a top-plan of another form of means for connecting the tracing-arm or stylus with the steering means; and Fig. 12 is a view similar to Fig. 2, but showing another means for connecting the steering mechanism with the tracing-arm or stylus.

Referring to the drawings, the numeral 1 indicates, in a conventional manner, an automobile to which my invention has been applied, 2 being the chassis, 3 the steering-wheel, the shaft 4 of which extends and is journaled in usual manner. The usual mechanism connects the shaft 4 with the front wheels of the car, including the connecting-rod 5, steering-crank 6, the rod 7 and opposite steering-crank 8. The chart-box embodying my invention is indicated by 9 and in this instance of my invention comprises the rectangular frame shown in Figs. 1 to 5, which will, presently, be described in detail. The location of the chart-box is preferably just inside the body of the car and upon a bracket 10, supported by the dash-board 11, at one side of the steering-shaft 4, as clearly shown in Figs. 1, 2 and 12. The chart-box may, however be secured to the front door at the steering-wheel side of the car, the object being to place the same conveniently for observation and manipulation by the driver. The hub of the wheel, on the steering side of the car, preferably, and on its inside, is provided with a gear 12, see Figs. 2 and 8, and meshing therewith is a pinion 13, carried by the shaft 14, journaled in the gear-box 15, supported upon one of the arms 6 of the steering-crank, jointed as usual to the shaft 16. The gear-box 15 has extending therefrom the flexible shaft 19, which is extended to the chart-box at 20, and is connected to the worm-shaft 21, journaled on the bottom of the chart-box in bearings 22, said shaft 21 carrying the worm 23, meshing with the worm-gear 24, carried by the vertical shaft 25, having at its upper end the worm 26, secured in proper position thereon by the collar 27. The shaft 25 is held in vertical position by the standard 28, having the sleeve 29 extended at a right-angle therefrom, through which the shaft 25 passes and which latter is prevented from having vertical movement in its bearings by the collar 30, secured thereto beneath the sleeve 29. The lower end of the shaft 25 is also journaled in the base 31 of the standard 28, see Fig. 3. The shaft 21 extends transversely of the chart-frame or box substantially midway between its ends and the shaft 25 extends vertically within the said box substantially midway between its sides. The chart-frame or box consists of the bottom portion 32, which supports all the elements of my apparatus, and a removable cover consisting of the opposite side-portions 33 and 34, the opposite end-portions 35 and 36, and the top-portion including the rectangular frame 37, seated upon the sides and ends and having set therein the plate-glass or other suitable transparent medium 38, through which to view the operations of the indicating-arm and chart-web. Within the box thus constructed, four end-supports are provided, two being at the front end and indicated by 39 and two being at the rear end and indicated by 40. Midway between the said pairs of supports and on the opposite sides of the box are the supports 41. The front supports 39 have journaled therein the receiving web-cylinder 42, provided in its center with the cut-out portions 43, provided with a hook 44, to which one end of the web 45 is secured. The web, in its travel, extends over an idle-roll 46, at one end of the table 47, which extends substantially from end to end of the box and terminates adjacent a similar idle-roll 48, journaled in the opposite supports 40. The web, at the opposite end of the table 47, extends over the roll 48 and down to the delivery web-cylinder 49, having a cut-out space and hook the same as the cylinder 42, the cylinder 49 being journaled in the supports 40. The web-cylinder 42 is provided at its opposite ends, outside the supports 39, with the pulleys 50, around which extends the bands 51, carried at the opposite ends of an angular shaft 53, journaled in the supports 41. Slack take-up rolls 54 are carried by the bars 55, secured to the opposite supports 41, said rolls engaging the lower strand of the respective belts 51. Viewing Figs. 6 and 7, it will be seen that the pulleys 52 are carried by the elongated journals 56, upon which are set the gears 57, the hub of which extends oppositely to the journal 56, the pulleys and gears thus embracing the respective supports 41. The angular shaft 53 is sufficiently long to extend from side to side of the box and into an aperture 58, in one side or the other of said box; and said shaft is longitudinally movable in the journals 56, of the pulleys 52, said movement being limited in one direction by the collar 59, set upon said shaft and adapted to engage with the adjacent gear 57. In the opposite direction, the shaft 53 is limited in its movement by the coiled-spring 60, surrounding said shaft and engaging at one end the face of the adjacent gear 57, and at its other end a collar 61, set upon the said shaft. The knob-extension 62 enables manipulation of the shaft longitudinally, and also axially when the worm-gear 63, fixed thereto substantially midway between its ends, is thrown out of engagement with the worm 26, carried by the shaft 25, the spring 60, under this condition, as shown in Fig. 7, being compressed and having power stored therein capable of forcing the shaft 53 in the opposite direction until the collar 59 engages the adjacent gear 57 and the gear 63 again goes into mesh with the worm 26, as shown in Fig. 6.

A presser-roll 64 is arranged at each corner of the box, one pair being journaled upon the supports 39 and the other upon the supports 40, these rolls having the function of maintaining the web 45 in depressed position and in proper coöperation with the idle-rolls 46 and 48, it being noted, upon reference to Figs. 4, 6 and 7, that the web 45, along its opposite margins, is provided with a series of angular apertures 65, in which, and with the walls of which, the teeth of the gears 57 engage to positively feed the web from one roll to the other in the direction of the arrow, Fig. 4. The pulleys 50 and 52 and the band 51, connecting the same, are for the purpose of aiding the feed of the web 45 and overcoming any back-drag which might occur by reason of the weight of the web on the cylinder 42. A tension-device consisting of the anti-friction roll 66 is maintained in engagement with the web on the cylinder 49, by means of the tension-spring 67, secured to the base of the box 32, by the screw 68. Thus the feed of the web is imparted from the driving-gear 12—13, through the flexible shaft 19, horizontal shaft 23, vertical shaft 25 and angular shaft 53 imparting rotation to the web-feed-gear 57.

The connecting-rod 5 has secured thereto, in any suitable manner, a rod 69, connected to the crank-arm 70, in turn connected to the flexible shaft 71, said shaft, at is upper end, being connected at 72, Figs. 1 and 5, with the vertical shaft 73, journaled in the bottom 32, at the front end of the box, and near its upper end being journaled in the bearing 74, secured to one of the supports 39. The bearing 74 has extending vertically therefrom an arm 75, having at its upper end the angular bearing 76, in which slides the bar 77, having at one end a short rack 78, engaging pinion 79, carried on the upper end of the shaft 73. The other end of the bar 77 is also provided with a short rack 80, meshing with the pinion 81, carried on the journal of the arm 82, Fig. 3, mounted to swing upon the cone-points 83 bearing in the opposite lugs 84, of an arm 85, carried by the opposite support 39. The arm 85, adjacent the lugs 84, is also provided with the bearing 86, in which slides the adjacent end of the bar 77. In order to take up wear, or secure the proper adjustment, the lower lug 84 is provided with a screw-bearing 87, for the lower cone-point 83. The forward end of the arm 82 is provided with a holder or socket 88, in which may be secured a pencil or indicating point 89, which bears lightly upon the web 45. Thus, control of the arm is maintained through the connection 69, with the flexible shaft 71, and the steering-shaft 4, and it will be seen that every movement in either direction given to the steering-shaft 4 will be imparted correspondingly to the tracing-arm 82, and a corresponding record will be made upon the web 45. In fact, every direction given to the car, according to the manner in which the car is steered, will be accurately charted upon the web 45, as shown in Fig. 4; and every direction indicated on the chart already made can be followed accurately by the driver of the car by simply manipulating the steering-wheel in such manner as to follow with the tracing-point the charted lines indicating the direction to be followed. This will be readily understood upon reference to Fig. 4.

In the form of my invention shown in Fig. 11, the rack-bar 77 is extended beyond the chart-frame, as at 90, and has joined therewith the connecting-rod 91, which, at its opposite end, is pivoted at 92, to the hub of the steering-wheel 3, or to the shaft 4, as desired. By this means, the arm 82 is given every movement which is imparted to the steering-wheel and, consequently, the map or chart fed through the apparatus can be accurately followed, or, if a chart is being made, every bend, curve and turn in the road can be accurately charted.

In the form of my invention shown in Fig. 12, the crank 70, of the flexible shaft 71, is connected by the rod 93, directly to the arm 6 of the steering-crank, this giving a direct connection from the steering-crank to the said flexible shaft instead of transmitting the movement to said shaft by the intermediate connection 69, from the rod 5, or the adjacent portion of the steering mechanism of the car.

In Figs. 9 and 10, I have shown a means by which the web-cylinders 42 or 49 can be released from their supports and, particularly, I have illustrated, for example, the web-cylinder 42, as provided with the hollow spindle 94, journaled at one end upon the extended end 95, of a pin 96, projecting through the bearing 97, in one of the supports 39, and having at its outer end the manipulating head 98, whereby the pin may be withdrawn to withdraw the end 95 thereof from the spindle 94. In withdrawing the pin, the head 99 thereof compresses the spring 100, within the socket 101, with a tendency to return the pin after the release thereof by the cross-bar 102, which has been turned across the end of the bearing 97, after being withdrawn from its slot 103. The opposite end of the spindle 94 may or may not be supported in similar manner, as desired. And it will be readily seen that, by manipulating the head 98 of the pin, a spindle may be set in and removed from the frame easily and at will.

Having thus described the details of my invention, the following mode of operation will be readily understood: Assuming a car to be rigged with my apparatus and the party to be desirous of following a given route represented by the charted lines 105 thereof, on a given web 45, the latter will be set in the frame after its cover, comprising a top, two sides and ends have been removed; that is to say, the web-spindle, at one end, will be entered in the slot 104, Fig. 5, of one of the supports 39, and the pin 96 will then be withdrawn and held as in Fig. 10, until the spindle 94 is made to register with the end 95 of said pin. The latter will then be released and the cylinder will be properly supported in the machine. The web on the delivery-cylinder 49 will then be set in place and the end of the web will then be carried vertically around the idle-roll 48, Figs. 3 and 5, and under the two adjacent depressing-rolls 64, over the table 47, and between the idle-roll 46 and coöperating depressing-rolls 64 at the other end of the frame, then downwardly to the spindle 42, on the hook of which the end of the web will be caught. The tension-roll 66 will bear against the web on cylinder 49 and automatically apply its tension as the latter is unwound from the cylinder 49. The web will then be adjusted so that the gear-wheels 57, at opposite sides of the frame, will enter the apertures 65, in the margins of the web, Fig. 4. The driving-belts 51 will then be adjusted upon the pulleys 50 and 52. The cover will now be set in place with the shoulder 106 around its bottom edge in place upon the top surface of the bottom 32, of the apparatus. In this position, the cover is locked in place by swinging the pivoted latches 107 on the cover, for example, under the headed-pins 108 on the bottom 32, thus preventing the cover from rattling or becoming displaced during travel. The apparatus is thus made ready for use for making a chart of the road or following a chart or map already made. The steering-wheel will then be manipulated by the driver so as to bring the indicator 89 upon the line and at the point from which the car starts on its journey under the directions given on the chart. As the car travels, the web will be fed from the delivery-cylinder 49 to the receiving-cylinder 42, by the gears engaging the margins of the web and by the driving-band 51, the latter medium being employed to relieve the web of drag which might be occasioned by the weight of the web, or friction of the cylinder 42 thereof in its bearings. The driver of the car controls the action of the arm 82 and its point 89, since he controls the direction of movement of the car and said arm is directly connected with the steering mechanism. The feed of the web, with reference to the speed of the car by the gearing shown, is approximately ten to one; that is to say, for every ten miles of travel of the car, the chart-web 45 will move one foot. With the direction of movement of the car forward, as shown, for example, in Fig. 2, the driving-gear 12 will move in the direction of the arrow *a*, Fig. 8, the pinion 13 in the direction of the arrow *b*, and the flexible shaft 19 in the direction of the arrow *c*. This will cause the worm-shaft 21 to rotate in the direction of the arrow *d*, Fig. 3, the vertical shaft 25 in the direction of the arrow *e*, the gearing 57 and 63 in the direction of the arrow *f*, and the web will be caused to travel in the direction of the arrow *g*, thus carrying the web from the delivery-cylinder 49 to the receiving-cylinder 42, the band 51 traveling in the direction of the arrow *h*.

Practically the same procedure will be carried out provided the party in the car is desirous of producing a chart, or charting the route pursued by it. That is to say, a cylinder of appropriate paper will be placed in the machine, a pencil substituted for the indicator 89, and the car started into operation. For every movement given the steering mechanism, as in turning curves, corners, bends, etc, a correct delineation thereof will be traced upon the web 45 and, in addition thereto when road-houses or other indicating monuments are reached, one or two vibrations of the pencil can be given to note the fact and place on the chart, which latter can be subsequently gone over and indexed so that, in following the same thereafter, the driver of the car will know the various monuments as they occur in the road and can see whether they tally with the ones on the chart.

While I have described my invention as applied to a road vehicle of the automobile type, I desire to have it understood that it is equally applicable to vehicles of other types, whether traveling on land, water, or tracks, and that, in my claims, I purpose covering my invention by language broad enough to comprehend all types of vehicles irrespective of how propelled or where traveling.

From the foregoing description, it will be seen that I have produced a convertible mechanism by which charts may be produced, or by which delineations upon maps or charts may be traced; and that, with my device or apparatus, maps of any course can be made, as well as followed, whether the course be of a road, of a watercourse, or in the air.

Having thus described my invention, what I claim and desire to secure by Letters Patent is:

1. In combination with a motor vehicle and the steering mechanism thereof; an inclosing casing arranged beside the controller of the steering mechanism; a web upon which a chart may be produced or on which a chart is delineated, arranged in said casing; means connected with the steering mechanism for either tracing the chart on the web, or producing on the web a chart; and means for causing the web to travel relatively to the vehicle at a predetermined speed relatively to that of the vehicle.

2. In combination with a motor vehicle and the steering mechanism thereof; a chart comprising a web, means for actuating the same, a tracing-arm and means for actuating the same; a casing in which the web and arm are inclosed, said casing being arranged beside the controller of the steering mechanism; and operating connections between the web-actuating mechanism and the steering mechanism, and between the tracing-arm and the steering mechanism.

3. In combination with a motor vehicle and the steering mechanism thereof; an inclosing casing arranged beside the controller of the steering mechanism; a chart mechanism comprising a traveling web, and an indicator arranged to travel relatively to the web, both the chart mechanism and indicator being mounted in the casing; means connecting the web with one portion of the steering mechanism; and means connecting the indicator with another portion of the steering mechanism.

4. A chart mechanism for road vehicles comprising a web-supporting mechanism arranged in view of the operator; means for traversing said web; a pivoted tracing-arm arranged in coöperative relation to said web; and means for causing said tracing-arm to move in the arc of a circle across said web, whereby the tracing-arm may be caused to follow delineations upon the web or produce delineations thereon.

5. A chart mechanism for vehicles comprising a table over which said web may be traversed in a horizontal plane; web-supporting means arranged at opposite ends of the table; a pivoted tracing-arm extending over the table; means for traversing the web longitudinally of the table and relatively to the arm; and means for swinging the arm on its pivot transversely of the web.

6. A chart mechanism for vehicles comprising a web-supporting means; means for traversing the web; a pivoted tracing-arm cooperatively arranged to move over said web; means for actuating the arm, including a rack-bar and pinion, a shaft to which the pinion is connected extending below the web, and a flexible shaft for driving the pinion-shaft.

7. A chart for vehicles comprising a web-supporting means; means for actuating the web; a pivoted tracing-arm coöperatively arranged to move over said web; means for actuating the arm; the web-actuating means including a worm-shaft and gear mechanism, and a flexible shaft for driving the worm-shaft.

8. A chart for vehicles comprising web-supporting and traversing means; a table over which the web travels; a pivoted tracing-arm arranged to swing over the table; and means for shifting the arm over the web in the arc of a circle, said means including a rack and pinion and a flexible shaft for driving the same.

9. In combination with a motor vehicle and the steering mechanism thereof; a chart comprising a web, means for actuating the same, a tracing-arm and means for actuating the same; a casing in which the web and arm are inclosed, said casing being arranged beside the controller of the steering mechanism; means operatively connecting the web-actuating mechanism with a revoluble member of said vehicle, and means operatively connecting said tracing-arm with said steering mechanism.

10. In combination with a motor vehicle and the steering mechanism thereof; an inclosing casing arranged beside the controller of the steering mechanism; a chart mechanism comprising a traveling web, and an indicator arranged to travel relatively to the web, both the chart mechanism and indicator being mounted in the casing, means operatively connecting the web-actuating mechanism with a r voluble member of said vehicle, and means operatively connecting said indicator with said steering mechanism.

11. In combination, a motor-driven vehicle, steering mechanism therefor comprising a steering wheel, a chart mechanism comprising a tracing-arm, means supporting said chart mechanism beside said steering wheel and in view of the operator, means operatively connecting said tracing-arm with said steering mechanism, a web arranged for coöperation with said tracing-arm, and means connected with a revoluble member of said vehicle for moving said web with respect to said tracing-arm at a predetermined speed related to that of said moving vehicle.

12. In a device of the character described, the combination with an elongated sheet of paper mounted upon an automobile, of a mechanism driven by one of the wheels of the automobile, actuating said sheet longitudinally, a marking device bearing upon said sheet, and means actuated by the steering mechanism of the automobile for shifting said marking device transversely of the sheet of paper.

13. The combination with a vehicle provided with steering means, of means carried by said vehicle for automatically making a record of the movement of said vehicle, comprising a pair of rollers, a thin flexible strip of material connecting and secured to said rollers, means coöperating with said vehicle to wind said strip upon one of said rollers at a rate of linear speed having a constant ratio to the speed of said vehicle, and means coöperating with said steering means for making a record on said strip.

14. The combination with a vehicle provided with steering means, of means carried by said vehicle for automatically making a record of the movement of said vehicle, comprising a pair of rollers, a thin flexible strip of material connecting and secured to said rollers, means coöperating with said vehicle and arranged to contact with said strip to wind said strip upon one of said rollers at a rate of linear speed having a constant ratio to the speed of said vehicle, and means coöperating with said steering means for making a record on said strip.

15. The combination with a road vehicle provided with steering mechanism, of a road map provided with a line indicating a predetermined route, means for successively displaying consecutive portions of said road map synchronously with the movement of the vehicle, and means operatively connected with said steering mechanism and arranged to be moved in accordance with said line for steering said vehicle over said route.

16. The combination with a road vehicle provided with steering means, of a chart of a predetermined route, mechanism actuated positively and continuously by said vehicle while in motion for moving said chart at a rate depending upon the speed of said vehicle and displaying consecutive portions of the same to enable the driver of said vehicle to steer the latter over said predetermined route, and means for throwing said mechanism out of operation and thereby stopping the movement of said chart at will while the vehicle is in motion.

17. The combination with a road vehicle provided with steering mechanism, of a pair of rollers, a thin flexible strip of material connecting and secured to said rollers, said strip being provided with the chart of a predetermined route, an indicator, mechanism actuated positively and continuously by said vehicle while in motion for winding said strip from one to the other of said rollers and moving the same relatively to said indicator at a rate depending upon the speed of said vehicle, and means for throwing said mechanism out of operation and thereby stopping the movement of said chart at will while the vehicle is in motion.

In testimonw whereof I have hereunto signed my name.

GEO. E. BOYDEN.